(12) United States Patent
Donohue et al.

(10) Patent No.: US 10,552,387 B1
(45) Date of Patent: **\*Feb. 4, 2020**

(54) MANAGING DATA USING A SIMULATION OF PURGING

(71) Applicant: Workday, Inc., Pleasanton, CA (US)

(72) Inventors: Seamus Donohue, Walnut Creek, CA (US); Sergio Mendiola Cruz, Dublin, CA (US); Ken Pugsley, Kansas City, MO (US); John Levey, Dublin (IE); Gerald Green, San Jose, CA (US); Iacopo Pace, Dublin (IE)

(73) Assignee: Workday, Inc., Pleasanton, CA (US)

( * ) Notice: Subject to any disclaimer, the term of this patent is extended or adjusted under 35 U.S.C. 154(b) by 265 days.

This patent is subject to a terminal disclaimer.

(21) Appl. No.: 14/970,271

(22) Filed: Dec. 15, 2015

(51) Int. Cl.
*G06F 16/00* (2019.01)
*G06F 16/215* (2019.01)
*G06F 16/23* (2019.01)

(52) U.S. Cl.
CPC ........ *G06F 16/215* (2019.01); *G06F 16/2365* (2019.01)

(58) Field of Classification Search
CPC ............... G06F 16/215; G06F 16/2365; G06F 11/1471; G06F 2201/80
See application file for complete search history.

(56) References Cited

U.S. PATENT DOCUMENTS

| | | | |
|---|---|---|---|
| 2005/0055519 A1* | 3/2005 | Stuart | G06F 17/30082 711/159 |
| 2008/0177802 A1* | 7/2008 | Haye | G06F 11/1448 |
| 2011/0087747 A1* | 4/2011 | Hirst | G06Q 10/107 709/206 |
| 2012/0198343 A1* | 8/2012 | Hirvonen | G06F 3/0605 715/734 |
| 2015/0186447 A1* | 7/2015 | Milousheff | G06F 17/30289 707/694 |
| 2016/0232159 A1* | 8/2016 | Parikh | G06F 17/30539 |

\* cited by examiner

*Primary Examiner* — Dinku W Gebresenbet
(74) *Attorney, Agent, or Firm* — Van Pelt, Yi & James LLP

(57) ABSTRACT

A system for managing data using simulated purging includes an input interface and a processor. The input interface is to receive an indication of a data to simulate purging. The processor is to mark the data as purge simulated at a purge simulated time, to monitor the data for an attempt to access the data after the purge simulated time, to increase a count of a number of attempts to access the data after the purge simulated time by one in response to an attempt to access the data after the purge simulated time, and to unmark the data as purge simulated and cease monitoring the data for the attempt to access the data in response to the count of the number of attempts to access the data after the purge simulated time exceeding a threshold.

12 Claims, 19 Drawing Sheets

500

Object Data Table

| ID | Attribute Bits | | | | | | | Data Blob |
|---|---|---|---|---|---|---|---|---|
| DA5B | 0 | 0 | 1 | 0 | 0 | 0 | 0 | <DA5B> |
| EA79 | 0 | 0 | 0 | 1 | 1 | 1 | 0 | <EA79> |
| 0264 | 0 | 0 | 0 | 0 | 0 | 0 | 0 | <0264> |
| B402 | 0 | 1 | 0 | 0 | 0 | 0 | 0 | <B402> |
| 7DAC | 0 | 0 | 1 | 0 | 0 | 0 | 0 | <7DAC> |
| 5CC3 | 0 | 0 | 0 | 1 | 1 | 0 | 0 | <5CC3> |
| D1D1 | 0 | 0 | 0 | 0 | 0 | 0 | 0 | <D1D1> |
| FFCF | 0 | 0 | 0 | 0 | 0 | 0 | 1 | <FFCF> |

Fig. 5

MANAGING DATA USING A SIMULATION OF PURGING

BACKGROUND OF THE INVENTION

A database system stores information for a computer system. As data is input into the database system, data structures to store the information are created. Some data structures store data that does not need to be permanently kept by the database system—for example, temporary data that was unnecessarily persisted. This data uses up valuable resources resulting in a computer system that runs inefficiently. In some cases, an application developer is relied on to properly remove unneeded data structures. However, this is also inefficient in addition to being error prone.

BRIEF DESCRIPTION OF THE DRAWINGS

Various embodiments of the invention are disclosed in the following detailed description and the accompanying drawings.

FIG. 5 is a diagram illustrating an embodiment of an object data table.

DETAILED DESCRIPTION

Figure 1:
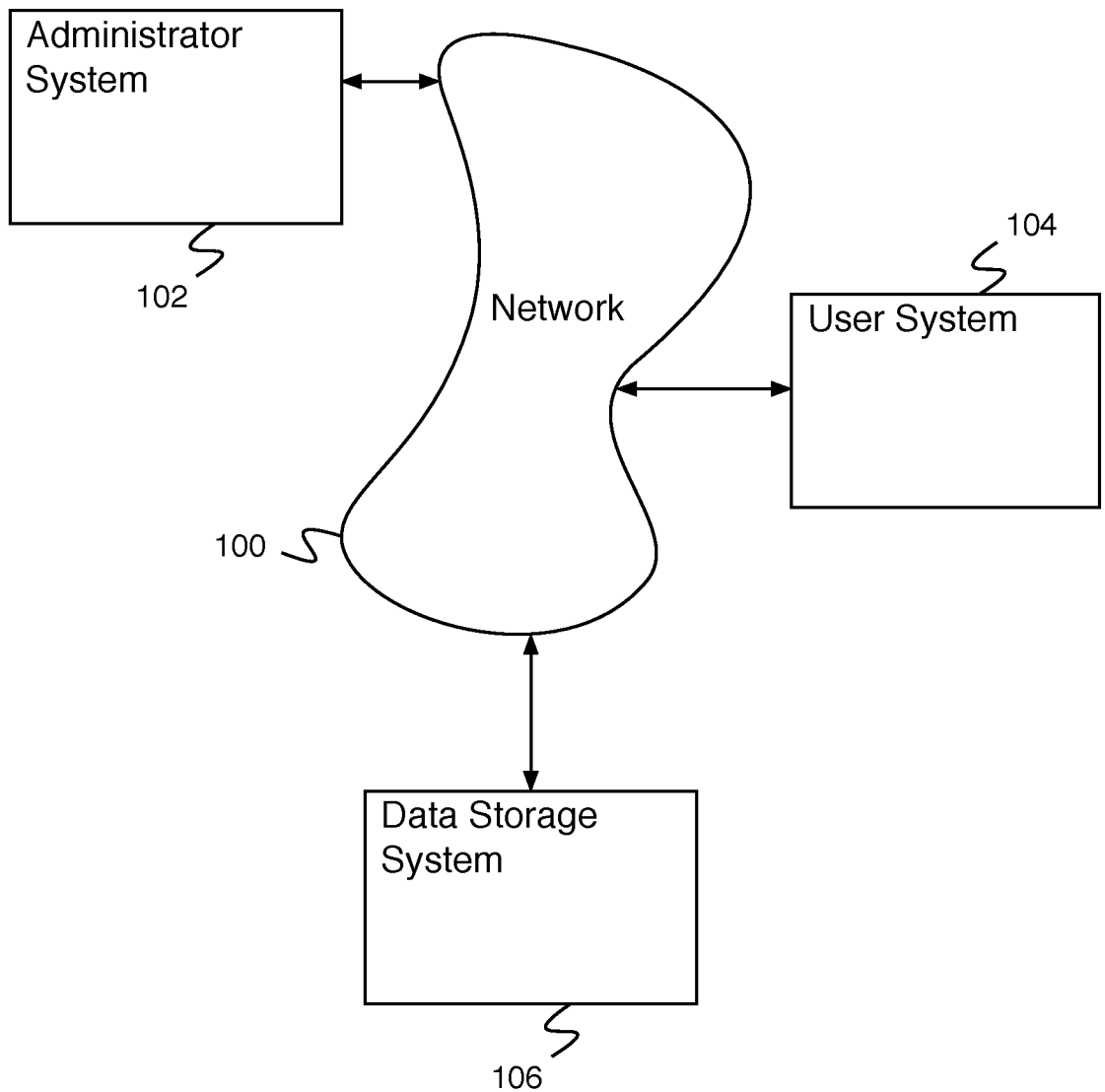
FIG. 1 is a block diagram illustrating an embodiment of a purging system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing data using purging is disclosed. A system for purging comprises an input interface for: receiving an indication of a data to be purged; and a processor for: preparing the data to be purged, wherein relations are severed as of purge time, and purging the data. In some embodiments, the system additionally comprises a memory coupled to the processor and configured to provide the processor with instructions.

A system for simulating purging comprises an input interface for: receiving an indication of data to simulate purging; and a processor for: indicating the data is purge simulated and monitoring the data for access. In some embodiments, the system additionally comprises a memory coupled to the processor and configured to provide the processor with instructions.

A system for restoring from purge comprises an input interface for: receiving an indication of purged data to restore; and a processor for: reinstating the purged data using a stored copy, and rebuilding relations to the purged data using an effective change stack. In some embodiments, the system additionally comprises a memory coupled to the processor and configured to provide the processor with instructions.

In some embodiments, a system for managing data using purging comprises a set of data stored in a database. The data is stored as a set of data objects, each object comprising attributes (e.g., data values), relationships (e.g., connections to other data objects), and methods (e.g., software code used for accessing, modifying, manipulating, etc. the data.). The system comprises an effective change stack associated with each data object, storing the history of the object as a set of changes that have been applied to the object over time. In some embodiments, a data object can include metadata indicating that it is purgeable. In some embodiments, a data object including purgeable metadata is deleted by the system for managing data using purging. In some embodiments, a process for purging data comprises a purge preparation step, a purge step, and a permanent deletion step. The data can be restored to operational status up until the permanent deletion step. The purge preparation step severs relationships and marks the data object as purge prepared. The purge step deletes the data object from the working memory, and marks the data object as purged, before storing it in purged memory. The permanent deletion step deletes the data object from the purge memory and deletes the effective change stack associated with the data. There is a period of waiting and monitoring in between each step to determine whether any attempts have been made to access the data object in the process of being purged. In the event a system administrator desires a purge process that uses greater care before removing data, a purge simulation process is used. The purge simulation process marks a data object as purge simulated but makes no other changes to it, and then monitors the data object for access. The system administrator determines whether to send the data to the purge process or to return it to operational status. The system administrator is able to additionally configure the process to automatically determine whether to send the data to the purge process or to return it to operational status based at least in part on the number of data accesses detected while monitoring the purge prepared data. In the event a system administrator determines that a data object that has been purged but not yet permanently deleted should be recovered (e.g., returned to operational status), a restoring from purge process is used. A restoring from purge process copies the purged data object back into operational memory from the purged memory and rebuilds relationships using the effective change stack associated with the data object.

FIG. 1 is a block diagram illustrating an embodiment of a purging system. In some embodiments, the network system of FIG. 1 comprises a system for managing data using purging. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network.

Administrator system 102, user system 104, and data storage system 106 communicate via network 100. In various embodiments, administrator system 102 comprises a system for an administrator to access data on data storage system 106, to create data structures on data storage system 106, to indicate removal of data structures on data storage system 106, or for any other appropriate purpose. User system 104 comprises a system for a user. In some embodiments, user system 104 comprises a system for accessing data storage system 106. Data storage system 106 comprises a system for managing an object-based database. In some embodiments, data storage system 106 comprises a system for storing data provided by a user (e.g., via user system 104 and network 100). In some embodiments, data storage system 106 comprises a system for removing data provided by a user. In some embodiments, data storage system 106 comprises a system for performing automated garbage collection.

Figure 2:
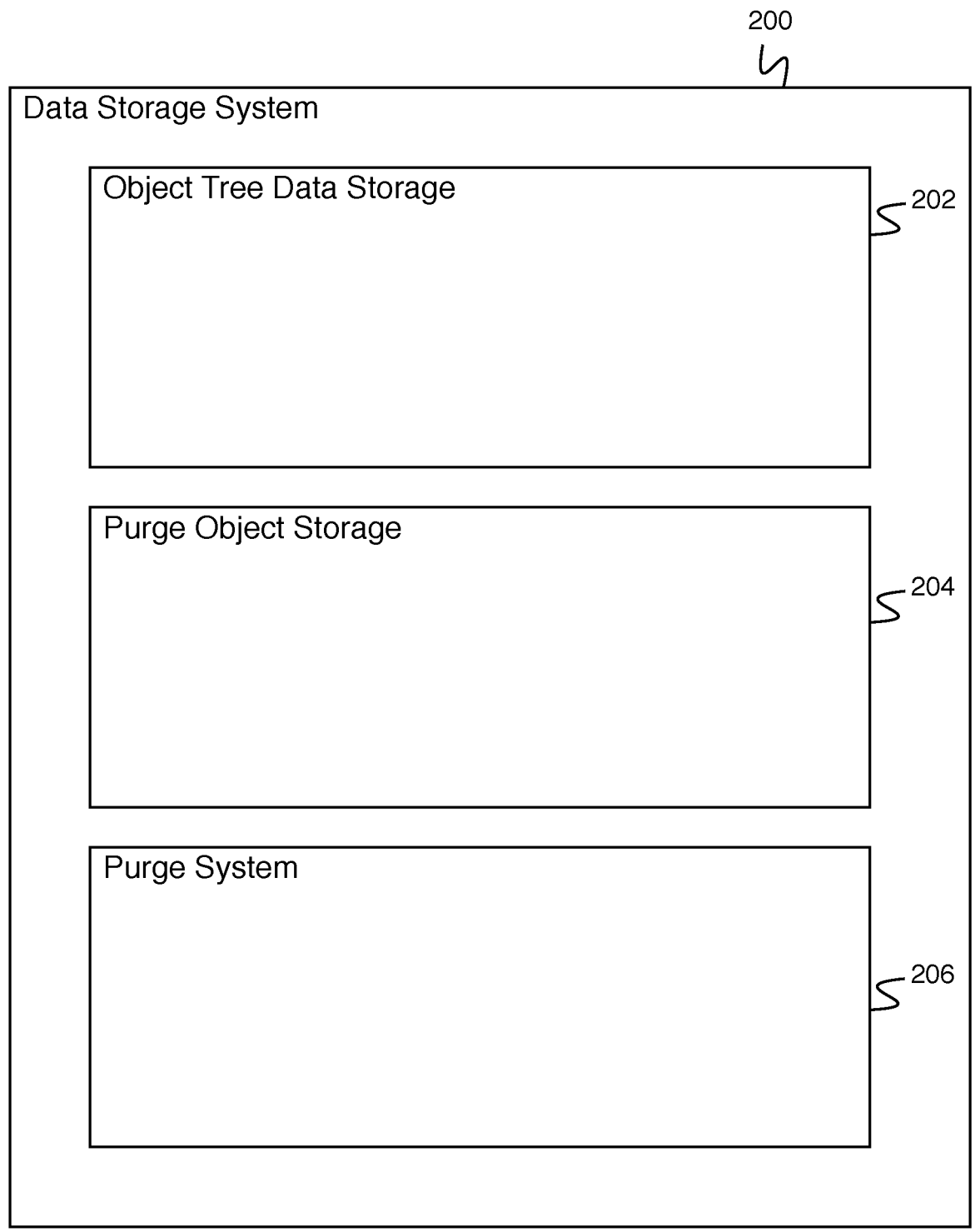
FIG. 2 is a block diagram illustrating an embodiment of a purging system.

FIG. 2 is a block diagram illustrating an embodiment of a purging system. In some embodiments, data storage system 200 of FIG. 2 comprises data storage system 106 of FIG. 1. In the example shown, data storage system 200 comprises a data storage system for managing data using purging. Data storage system 200 comprises object tree data storage 202. In some embodiments, object tree data storage 202 comprises an object tree database (e.g., a database for storing database data structured as an object tree). In some embodiments, object tree data storage 202 comprises one or more purge root objects (e.g., objects comprising purge root metadata). In some embodiments, object tree data storage 202 comprises one or more purge member objects (e.g., objects comprising purge member metadata). In some embodiments, object tree data storage 202 comprises a semiconductor memory (e.g., a random access memory, e.g., a RAM). Data storage system 200 comprises purge object storage 204. In some embodiments, purge object storage 204 comprises a storage for objects that have been purged. In various embodiments, purge object storage 204 comprises a storage for objects that have been purged, a temporary storage for objects that have been purged before permanent purging, or any other appropriate purge object storage. In some embodiments, purge object storage 204 comprises a separate physical memory from object tree data storage 202. In some embodiments, purge object storage 204 comprises a magnetic memory (e.g., a hard disk). Data storage system 200 comprises purge system 206. In some embodiments, purge system 206 comprises a system for identifying an object (e.g., an object stored in object tree data storage 202) for purging. In some embodiments, purge system 206 comprises a system for indicating to purge an object. In various embodiments, purging an object comprises marking an object as purged, moving an object to purge object storage 204, permanently deleting an object, or performing any other appropriate purge function. In some embodiments, purge system 206 is implemented using a processor.

Figure 3:
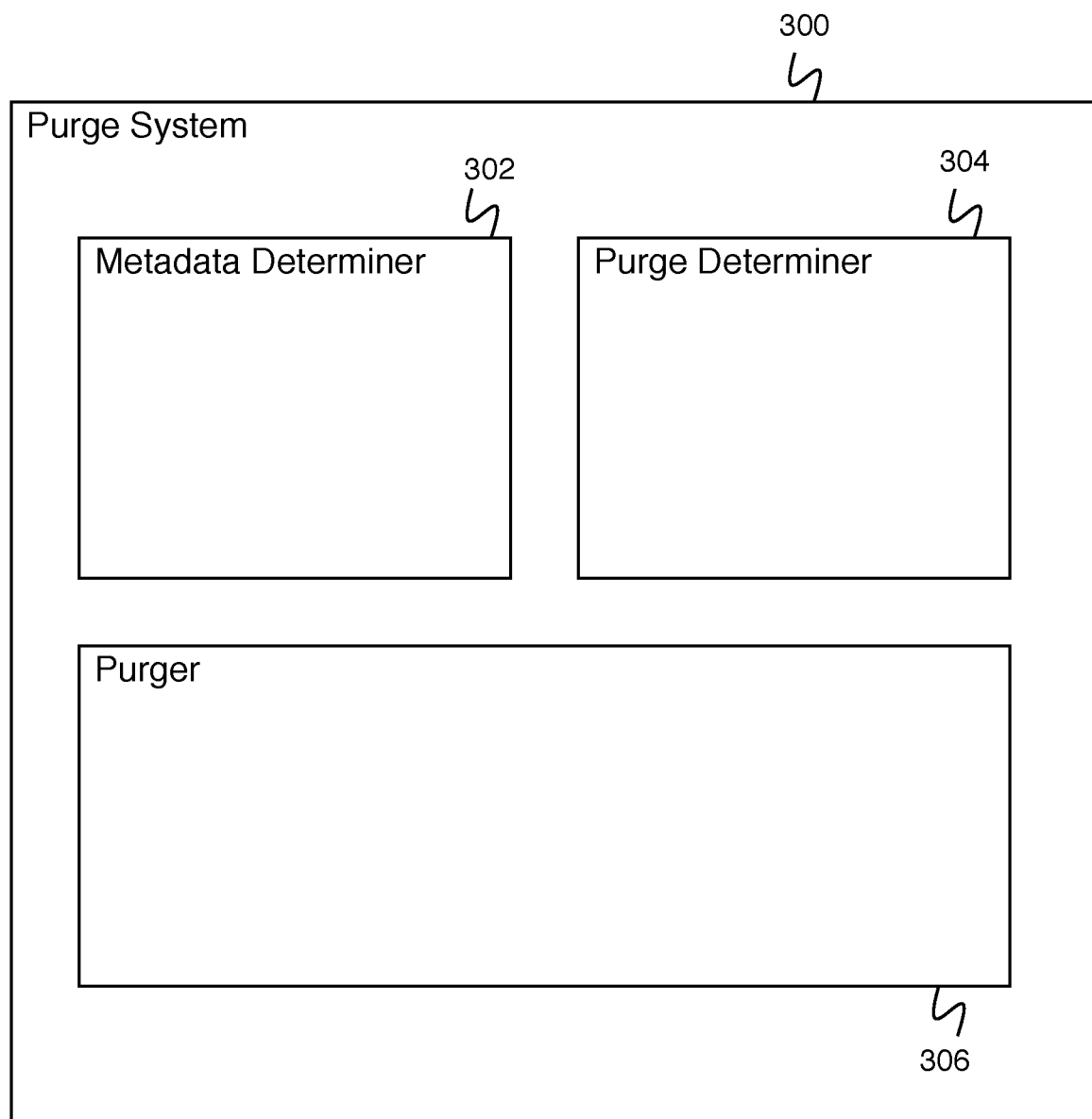
FIG. 3 is a block diagram illustrating an embodiment of a purge system.

FIG. 3 is a block diagram illustrating an embodiment of a purge system. In some embodiments, purge system 300 comprises purge system 206 of FIG. 2. In the example shown, purge system 300 comprises metadata determiner 302. In some embodiments, metadata determiner 302 comprises a metadata determiner for determining metadata associated with an object. In some embodiments, metadata determiner 302 determines whether an object comprises a purge root object (e.g., whether the object is associated with purge root metadata). In some embodiments, metadata determiner 302 determines whether an object comprises a purge member object (e.g., whether the object is associated with purge member metadata). In some embodiments, an object comprises associated metadata (e.g., the metadata is stored as part of the object). In some embodiments, an object database stores object information and associated metadata. In some embodiments, purge root metadata comprises inheriting from a purge root class (e.g., the purge root object inherits from a purge root class). In some embodiments, purge member metadata comprises inheriting from a purge member class (e.g., the purge member object inherits from a purge member class). In some embodiments, metadata determiner 302 is implemented using a processor. Purge determiner 304 comprises a purge determiner for determining whether an object (e.g., an object associated with purge metadata) should be purged. In various embodiments, purge determiner 304 determines whether an object should be purged based at least in part on its age, its relations to other objects, its associated data, or any other appropriate information. In some embodiments, purge determiner 304 is implemented using a processor. Purge system 300 additionally comprises purger 306. In some embodiments, purger 306 comprises a purger for purging an object (e.g., an object that purge determiner 304 determines should be purged). In some embodiments, purger 306 is implemented using a processor. In various embodiments, the elements of FIG. 3 are implemented on a single processor, each on a separate processor, or combined on a plurality of processors in any other appropriate way.

Figure 4A:
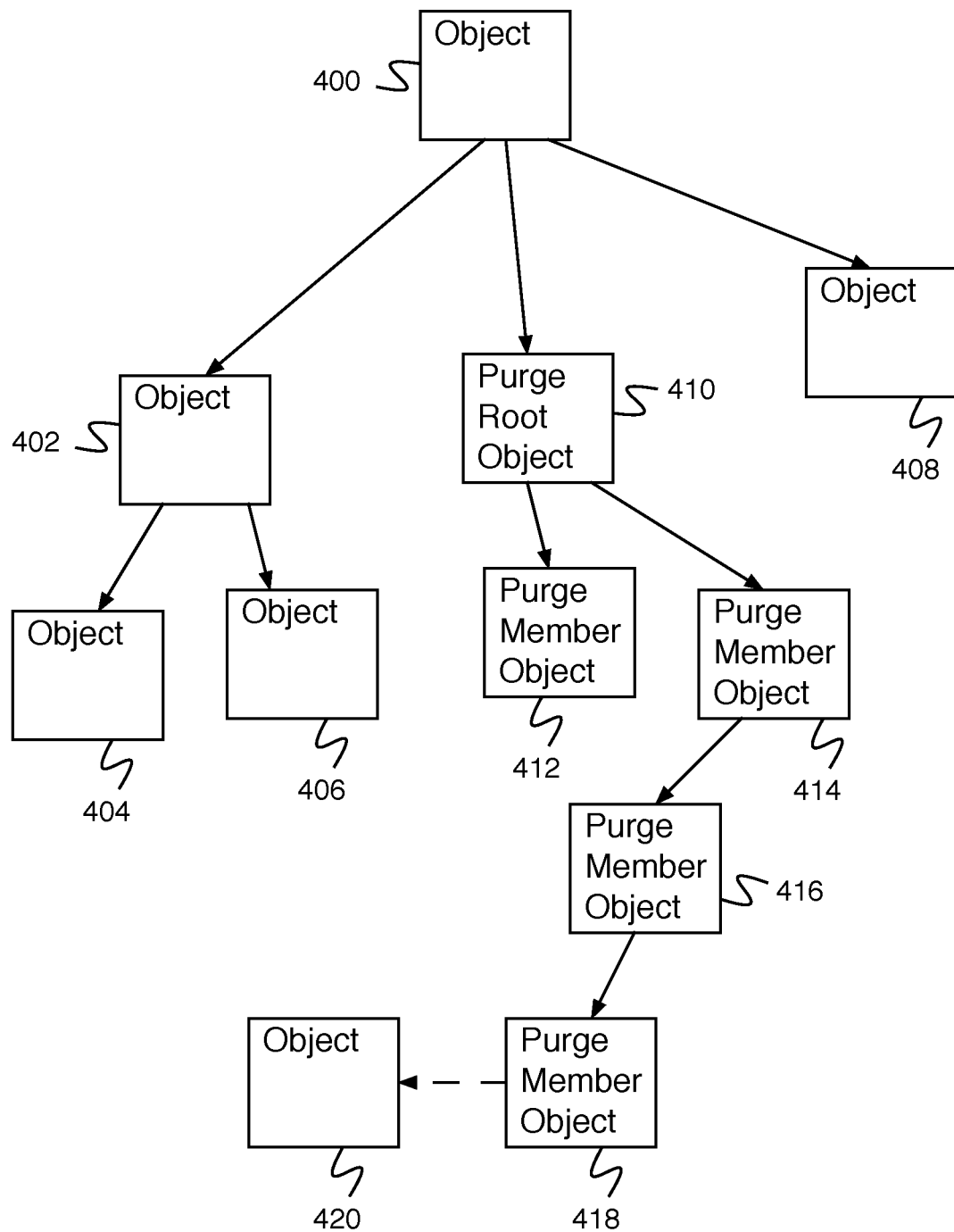
FIG. 4A is a block diagram illustrating an embodiment of an object tree.

FIG. 4A is a block diagram illustrating an embodiment of an object tree. In some embodiments, the object tree of FIG. 4A comprises an object tree stored in object tree data storage 202 of FIG. 2. In the example shown, object 400 comprises a top-level object. In some embodiments, an object tree comprises only one top-level object (e.g., a company or organization object). Object 402, object 404, and object 406 comprise a subtree of top-level object 400. Object 400 has a direct relation to object 402 and indirect relations to object 404 and object 406. Object 408 comprises a single object subtree of top-level object 400. Purge root object 410 comprises the top-level object of a subtree of object 410. Purge root object 410 is associated with purge root metadata. In some embodiments, purge root object 410 associated with purge root metadata indicates that the subtree that purge root object 410 is at the top level of comprises a purge subtree. In some embodiments, all objects descending the object are required to be associated with purge member metadata, and the tree of purge objects headed by purge root object 410 are purged together. In some embodiments, a purge root object represents an individually removable element of the database system (e.g., a payroll result, a performance review, etc.), and the member objects in the tree associated with the purge root object represent constituent parts of the element of the database system that should all be removed together. In the example shown, purge member object 412 and purge member object 414 have direct relations from purge root object 410 (e.g., there is a relation from purge root object 410 to purge member object 412 and from purge root object 410 to purge member object 414). Purge member object 416 and purge member object 418 have indirect relations from purge root object 410 (e.g., there is a relation from purge root object 410 to purge member object 416 with intervening object purge member object 414, and there is a relation from purge root object 410 to purge member object 418 with intervening objects purge member object 414 and purge member object 416). Purge member object 418 is connected to object 420 (e.g., an object that is not associated with purge root metadata or purge member metadata) via a weak relation. In some embodiments, a weak relation is the only kind of allowable relation from a purge object to a non-purged object. In some embodiments, a weak relation comprises a relation that can be broken when the purge object is purged. In some embodiments, a weak relation comprises a relation to an object that decorates or provides information about the object relating to it (e.g., name of a state or country, social media type, supervisor name, etc.).

Figure 4B:
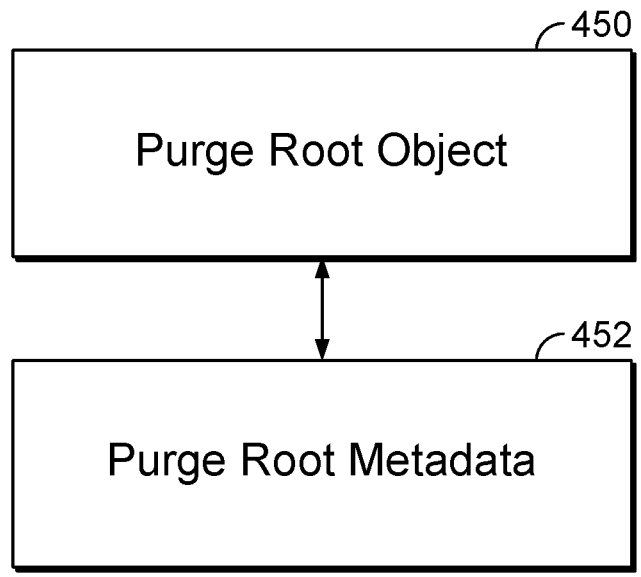
FIG. 4B is a block diagram illustrating an embodiment of a metadata association.

FIG. 4B is a block diagram illustrating an embodiment of a metadata association. In some embodiments, purge root object 450 of FIG. 4B comprises purge root object 410 of FIG. 4A. In the example shown, purge root metadata 452 is associated with purge root object 450. An association with purge root metadata 452 indicates whether or not a purge root object is eligible to be purged. The metadata association is used to determine what is eligible for purging, and then the purge algorithm traverses the purge objects, using these associations along with a set of rules/checks to determine the final object tree or subgraph to purge.

Figure 4C:
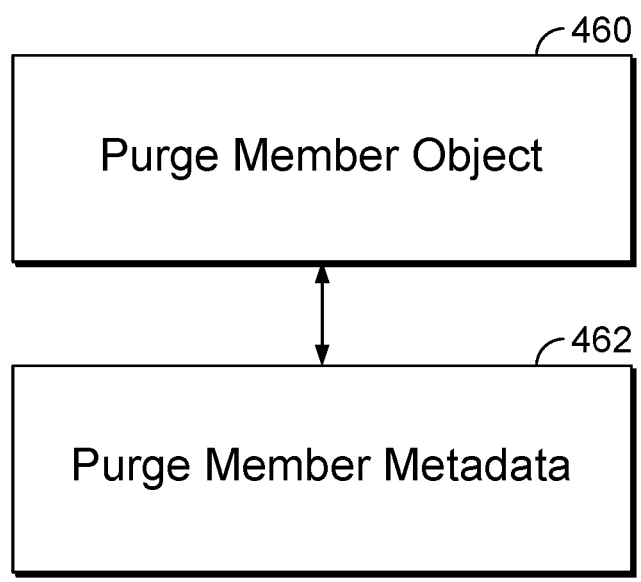
FIG. 4C is a block diagram illustrating an embodiment of a metadata association.

FIG. 4C is a block diagram illustrating an embodiment of a metadata association. In some embodiments, purge member object 460 of FIG. 4C comprises purge member object (e.g., purge member object 412, purge member object 414, purge member object 416, or purge member object 418) of FIG. 4A. In the example shown, purge member metadata 462 is associated with purge member object 460. Purge member metadata 462 indicates whether or not a purge member object is eligible to be purged. The metadata association is used to determine what is eligible for purging, and then the purge algorithm traverses the purge objects, using these associations along with a set of rules/checks to determine the final object tree or subgraph to purge.

FIG. 5 is a diagram illustrating an embodiment of an object data table. In some embodiments, object data table 500 comprises data describing each of a set of objects (e.g., each object of the object tree of FIG. 4). In the example shown, each object is associated with an object identifier. The information that is stored and is associated with the object in object data table 500 is linked by the object identifier with a corresponding object in an object tree. In some embodiments, the identifier comprises a hashed unique identifier (e.g., "DA5B", "EA79", etc.). In some embodiments, the identifier comprises an object type identifier (e.g., a number indicating the object type) and an object count identifier (e.g., a number indicating which instance of the type the object is). In the example shown, each object in object data table 500 comprises a set of attribute bits describing the object. In some embodiments, attribute bits indicate whether or not the object is in a particular state. In various embodiments, attribute bits indicate whether the object is purge prepared, purged, purge simulated, indicated for deletion, visible, readable, modifiable, regular, or any other appropriate object states. In the example shown, each object in object data table 500 is associated with a data blob (e.g., a binary large object). The data blob comprises binary data associated with the object. In some embodiments, object data table 500 comprises an identifier associated with the data blob for identifying the data blob associated with an object (e.g., object with identifier "DA5B" is associated with the data blob with identifier "<DASB>"). In some embodiments, a data blob comprises a compressed data blob. In some embodiments, a data blob comprises an encrypted data blob. In some embodiments, a data blob comprises an effective change stack (e.g., an ordered set of effective change objects describing changes that have been applied to the associated object).

Figure 6:
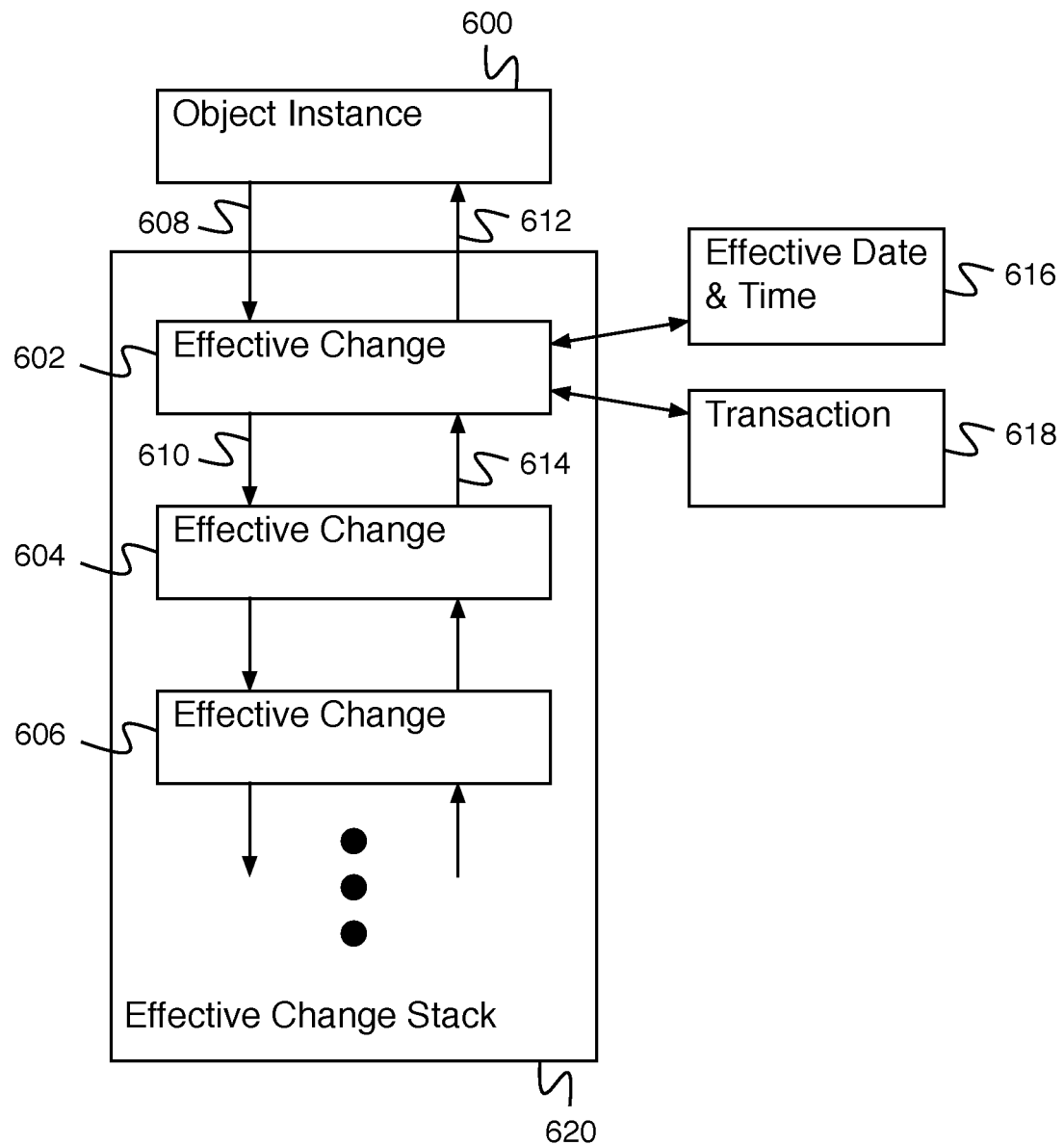
FIG. 6 is a block diagram illustrating an embodiment of an effective change stack.

FIG. 6 is a block diagram illustrating an embodiment of an effective change stack. In some embodiments, effective change stack 620 records the state of an object through time. In the example shown, object instance 600 has relationships 608 and 612 with effective change 602 (e.g., the effective change object at the top of effective change stack 620). Relationship 608 refers to the latest effective change for object instance 600. Relationship 612 refers to object instance 600 having effective changes as described, for example, by effective change 602. Effective change stack 620 comprises a plurality of linked effective change objects (e.g., effective change 602, effective change 604, effective change 606, etc.) Each effective change object is linked to an older effective change object (e.g., by an older change object relationship, e.g., relationship 610) and to a newer effective change object (e.g., by a newer effective change object relationship, e.g., relationship 614). In some embodiments, the older effective change object relationship from the oldest effective change object in effective change stack 620 points to nil, and the newer effective change object relationship from the newest effective change object in effective change stack 620 points to object instance 600. Each effective change object of effective change stack 620 comprises a relation to an effective date & time object (e.g., effective date & time object 616) and a transaction object (e.g., transaction object 618). In some embodiments, an effective date & time object comprises an effective date and time associated with an object transaction. In some embodiments, a transaction object comprises information describing an object transaction (e.g., a change made to an object). In some embodiments, effective change stack 620 comprises the set of all transactions made to object instance 600. In some embodiments, effective change stack 620 is used to determine the state of object instance 600 at any point in time. In some embodiments, effective change stack 620 is stored compressed. In some embodiments, effective change stack 620 is stored encrypted. In some embodiments, effective change stack 620 comprises a data blob (e.g., a data blob associated with an object in an object data table, e.g., object data table 500 of FIG. 5).

In some embodiments, objects that are permanently deleted also include deletion of their effective change stack. In some embodiments, permanently deleted objects, which are still referenced in the effective stack of an operational object, are not removed or updated; they are left as-is. In various embodiments, purged objects in other effective stacks show as blank or unavailable or empty, or any other appropriate entry.

Figure 7:
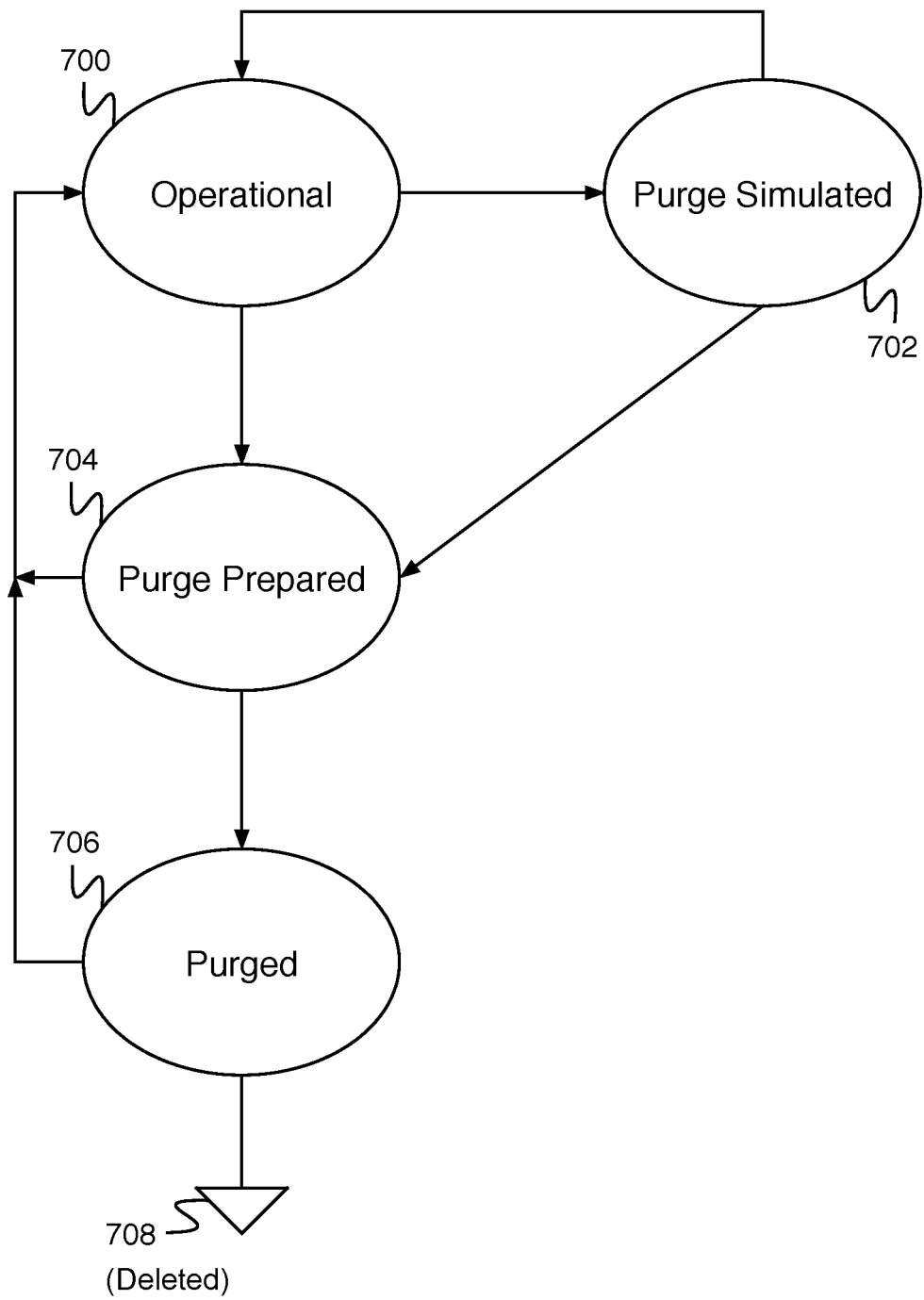
FIG. 7 is a state diagram illustrating an embodiment of object state transitions.

FIG. 7 is a state diagram illustrating an embodiment of object state transitions. In some embodiments, the state diagram of FIG. 7 illustrates object state transitions of an object in an object tree (e.g., the object tree of FIG. 4). In the example shown, an object in operational state is available for normal use. An object in operational state can transition to purge simulated state 702 or to purge prepared state 704. In some embodiments, purge simulated state 702 comprises a state for simulating a data purge. In some embodiments, purge simulated state 702 comprises a state for determining whether purging the object will result in any unforeseen problems. In some embodiments, purge simulated state 702 comprises a state for determining whether the object is accessed. In some embodiments, an object in purged simulated state 702 is monitored for access. In some embodiments, in the event an attempt to access an object in purged simulated state 702 is made, an error is indicated. An object in purge simulated state can return to operational state 700 or can transition to purge prepared state 704. In various embodiments, a decision of whether to transition to operational state 700 or purge prepared state 704 is made by a human, is made automatically by an algorithm, is made based at least in part on a number of accesses of the object, is made based at least in part on a type of access, is made after a predetermined period of time in purge simulated state 702, or is made in any other appropriate way. Purge prepared state 704 comprises a state wherein the object is prepared for purging. In various embodiments, preparing an object for purging comprises deleting relations to the object, removing access to the object, indicating that the object is prepared for purging in an object attribute, indicating that the object is prepared for purging in an object data table, or any other appropriate purge preparation actions. In some embodiments, preparing an object for purging comprises all necessary actions for purging other than actually purging the object (e.g., deleting the object from working memory). An object in purge prepared state 704 can transition to operational state 700 or to purged state 706. In some embodiments, an object in purge prepared state 704 is monitored for access. In various embodiments, in the event a process attempts to access the object in purge prepared state, an error is provided to an administrator, an error is logged, the object is automatically transitioned to operational state 700, the object is indicated for later transition to operational state 700, or any other appropriate indication is made. In some embodiments, in the event an object in purge prepared state 704 transitions to operational state 700, relations are rebuilt. In some embodiments, relations are rebuilt using an effective change stack. In some embodiments, in the event an object in purge prepared state 704 transitions to operational state 700, indications of purge prepared 704 state are removed. In some embodiments, an object in purge prepared state 704 transitions to operational state 700 when indicated to by an administrator. In some embodiments, an object in purge prepared state 704 transitions to purged state 706 after a predetermined period of time. In some embodiments, an object in purge prepared state 704 transitions to purged state 706 after a predetermined period of time without any attempts to access the object. In various embodiments, the predetermined period of time comprises a configurable time, a configurable number of weeks, two weeks, a configurable number of logins, six administrator logins, a configurable number of software updates, three software updates, or any other appropriate period of time. In some embodiments, a setting of the configurable time, the configurable number of weeks, the configurable number of logins, or the configurable number of software updates is done using a configuration file, by user selection, by default selection, by preset values, or any other appropriate manner of configuration. Purged state 706 comprises a state wherein the object is purged. In various embodiments, purging the object comprises marking the object (e.g., marking the object as purged or preparing to be purged), disconnecting the object or the group of objects to be purged (e.g., disconnecting relations to the object or the group of objects to be purged), deleting the object, marking and then deleting the object, marking as preparing to be purged then deleting and then marking as purged, indicating that the object is purged in an object attribute, indicating that the object is purged in an object data table, or any other appropriate purging action. In some embodiments, the object is left in the same database, but marked as purged. In some embodiments, the purged object is removed from working memory. In some embodiments, in the database, the permanent store, each instance has its own effective change stack. In some embodiments, in the event that the instance is removed from working memory, the object remains in the database. In some embodiments, when accessing permanent storage (e.g., the database), all purged objects are ignored except when a purge recovery operation is executed. In some embodiments, a purge recovery operation restores a purged object back to the working memory including restoring relations, restoring object with attributes and methods, etc. In some embodiments, the purge prepared step disconnects relations and the relations cannot be traversed. An object in purged state 706 can transition to operational state 700 or to permanently deleted 708. In various embodiments, in the event an object in purged state 706 transitions to operational state 700, relations are rebuilt, the object is moved from purge memory to working memory, indications of purged state 706 are removed, or any other appropriate operational state modifications are made. In some embodiments, an object in purged state 706 transitions to operational state 700 when indicated to by an administrator. In some embodiments, an object in purged state 706 transitions to permanently deleted 708 after a predetermined period of time or any other condition defined, including a decision made by an administrator. In various embodiments, the predetermined period of time comprises three weeks, four administrator logins, four software updates, or any other appropriate period of time. In some embodiments, permanently deleted 708 comprises the state of the object being permanently deleted from memory. In some embodiments, the object is permanently deleted from purge memory. In some embodiments, object data is permanently deleted from an object data table.

Figure 8:
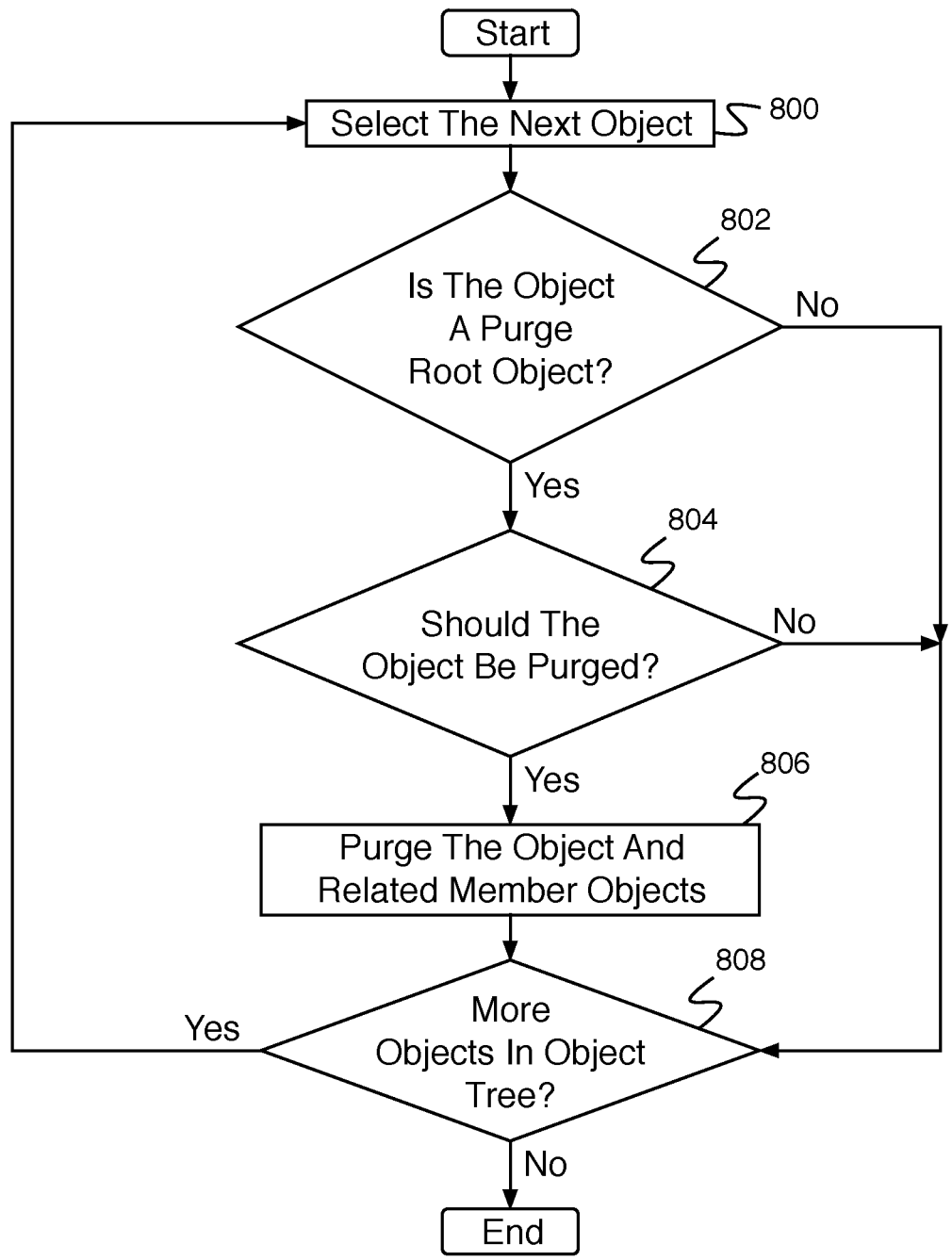
FIG. 8 is a flow diagram illustrating an embodiment of a process for data management.

FIG. 8 is a flow diagram illustrating an embodiment of a process for data management. In some embodiments, the process of FIG. 8 is executed by purge system 300 of FIG. 3. In the example shown, in 800, the next object (e.g., the next object in an object tree) is selected. In some embodiments, the next object comprises the first object (e.g., a root object). In some embodiments, a linear scan of all roots per class is done to identify a next object. In some embodiments, the next object comprises the next object according to a tree-traversal algorithm (e.g., depth-first, breadth-first, etc.). In some embodiments, the process of FIG. 8 comprises a scanning of an object tree. In some embodiments, the scanning excludes member objects below a root object. In various embodiments, the scanning is initiated according to a predetermined schedule (e.g., every day at midnight, every hour on the hour, etc.), the scanning is manually started, the scanning is initiated after a finalized process (e.g., a finalized payroll process, etc.), or the scanning is initiated at any other appropriate time. In 802, it is determined whether the object is a purge root object. In some embodiments, it is determined whether the object is a purge root object by determining whether the object is associated with purge root metadata. In the event it is determined that the object is not a purge root object, control passes to 808. In the event it is determined that the object is a purge root object, control passes to 804. In 804, it is determined whether the object should be purged. In some embodiments, it is determined whether the object should be purged using a purge determiner (e.g., purge determiner 304 of FIG. 3). In some embodiments, it is determined whether the object should be purged using one or more purge rules. In various embodiments, purge rules are based at least in part on object age, object relations to other objects, object associated data, or any other appropriate information. In the event it is determined that the object should not be purged, control passes to 808. In the event it is determined that the object should be purged, control passes to 806. In 806, the object and related member objects are purged. In some embodiments, from a root object that is to be purged, a recursive traversal is done to find members of the purge island to collect. In various embodiments, the recursive traversal of the object tree comprises a depth first traversal, a breadth first traversal, or any other appropriate traversal. In 808, it is determined whether there are more objects in the object tree. In the event it is determined that there are no more objects in the object tree, the process ends. In the event it is determined that there are more objects in the object tree, control passes to 800. In some embodiments, in the event it was determined that the previous object was a purge root object and it was determined that the previous object should not be purged, the next object is determined to be any member objects that is not related to the purge root object (e.g., either a tree of purge objects is purged all together, or it is all skipped, based on the evaluation of the purge root object). In some embodiments, instructions for the steps of the process of FIG. 8 are stored in a memory and provided for execution by a processor coupled to the memory. In various embodiments, the memory comprises a magnetic memory, a solid-state memory, an optical memory, or any other appropriate memory.

Figure 9:
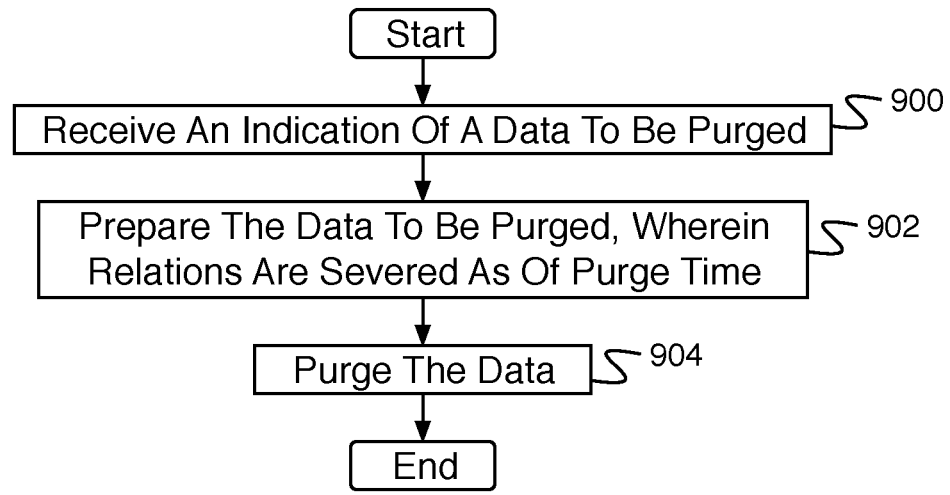
FIG. 9 is a flow diagram illustrating an embodiment of a process for purging including purge preparation.

FIG. 9 is a flow diagram illustrating an embodiment of a process for purging including purge preparation. In some embodiments, the process of FIG. 9 is performed by a purger (e.g., purger 306 of FIG. 3). In the example shown, in 900, an indication of a data to be purged is received. In some embodiments, the data to be purged comprises a data object or a set of data objects. In 902, the data is prepared to be purged, wherein relations are severed as of purge time. In some embodiments, 902 comprises the transition from operational state 700 of FIG. 7 to purge prepared state 704 of FIG. 7. In 904, the data is purged. In some embodiments, 904 comprises the transition from purge prepared state 704 of FIG. 7 to purged state 706 of FIG. 7. In some embodiments, purging the data comprises permanently deleting the data. In some embodiments, permanently deleting the data comprises the transition from purged state 706 of FIG. 7 to deleted 708 of FIG. 7.

Figure 10:
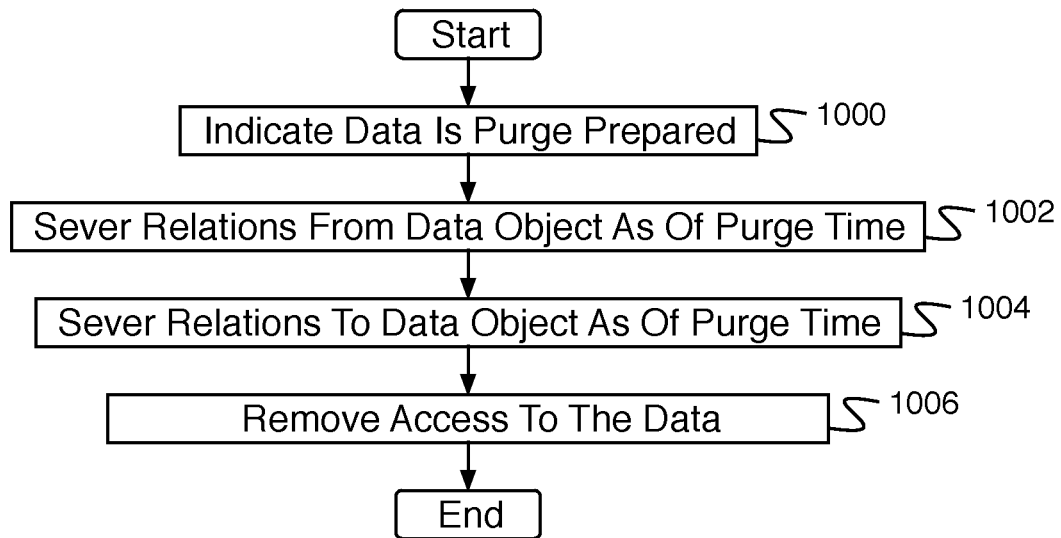
FIG. 10 is a flow diagram illustrating an embodiment of a process for preparing data for purge.

FIG. 10 is a flow diagram illustrating an embodiment of a process for preparing data for purge. In some embodiments, the process of FIG. 10 implements 902 of FIG. 9. In the example shown, in 1000, it is indicated that the data is purge prepared. In some embodiments, indicating that the data is purge prepared comprises making an indication to the data object that it is purge prepared (e.g., setting a purge prepared attribute stored by the object). In some embodiments, indicating that the data is purge prepared comprises setting an attribute in an object data table (e.g., object data table 500 of FIG. 5). In 1002, relations from the data object are severed as of purge time. In some embodiments, severing relations as of purge time comprises indicating that the relations are severed at purge time. In some embodiments, a process with an effective time before the purge time is able to access the relations. In some embodiments, a process with an effective time after the purge time is not able to access the relations. In 1004 relations to the data object are severed as of purge time. When the object tree is traversed and the set of purge objects is determined, the weak references (e.g. relationships to and from the purge object to the non-purge objects) are determined, then during the purge prepare process these relationships are severed. In 1006, access to the data is removed. For example, web-based access, index access, or any other kind of access to the data is removed. In various embodiments, any access is prevented by removing most kinds of entry point or possible ways that could provide a path to access the purge prepared objects.

Figure 11:
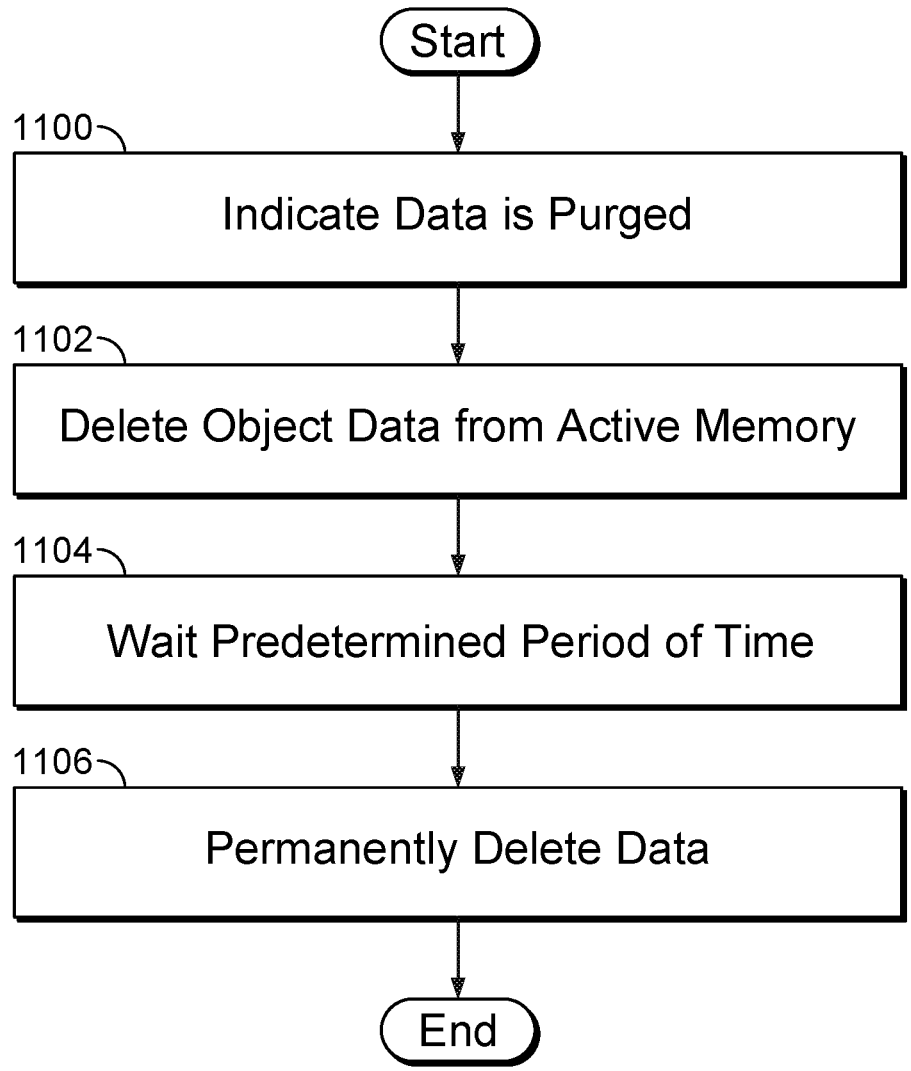
FIG. 11 is a flow diagram illustrating an embodiment of a process for purging data.

FIG. 11 is a flow diagram illustrating an embodiment of a process for purging data. In some embodiments, the process of FIG. 11 implements 904 of FIG. 9. In the example shown, in 1100, it is indicated that the data is purged. In some embodiments, indicating that the data is purged comprises making an indication to the data object that it is purged (e.g., setting a purged attribute stored by the object). In some embodiments, indicating that the data is purged comprises setting an attribute in an object data table (e.g., object data table 500 of FIG. 5). In 1102, object data is deleted from active memory. In 1104, a predetermined period of time is waited. For example, the system process waits for a predetermined time prior to deleting the data. In various embodiments, the predetermined period of time comprises four weeks, two administrator logins, five software updates, or any other appropriate period of time. In 1106, the data is permanently deleted. In some embodiments, the data is permanently deleted from the purge memory. In some embodiments, permanently deleting data comprises permanently deleting associated data from an object data table.

Figure 12:
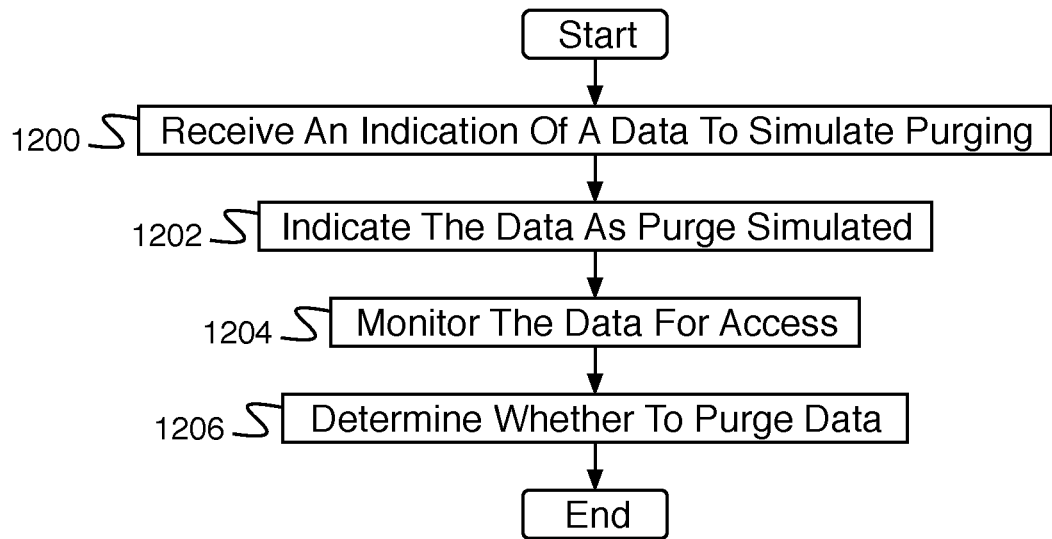
FIG. 12 is a flow diagram illustrating an embodiment of a process for purge simulation.

FIG. 12 is a flow diagram illustrating an embodiment of a process for purge simulation. In some embodiments, the process of FIG. 12 is performed by a data storage system (e.g., data storage system 200 of FIG. 2). In the example shown, in 1200, an indication of a data to simulate purging is received. In 1202, the data is indicated as purge simulated.

In various embodiments, indicating the data as purge simulated comprises setting a memory attribute associated with the data indicating the data is purge simulated, setting an attribute in an object data table indicating the data is purge simulated, adding an entry to a log file indicating the data is purge simulated, setting a location in a map in memory on a class container for all purge simulated objects for the class, or indicating the data as purge simulated in any other appropriate way. In 1204, the data is monitored for access. In some embodiments, monitoring the data for access comprises checking for a purge simulation indication each time data is accessed. In 1206, it is determined whether to purge data.

Figure 13:
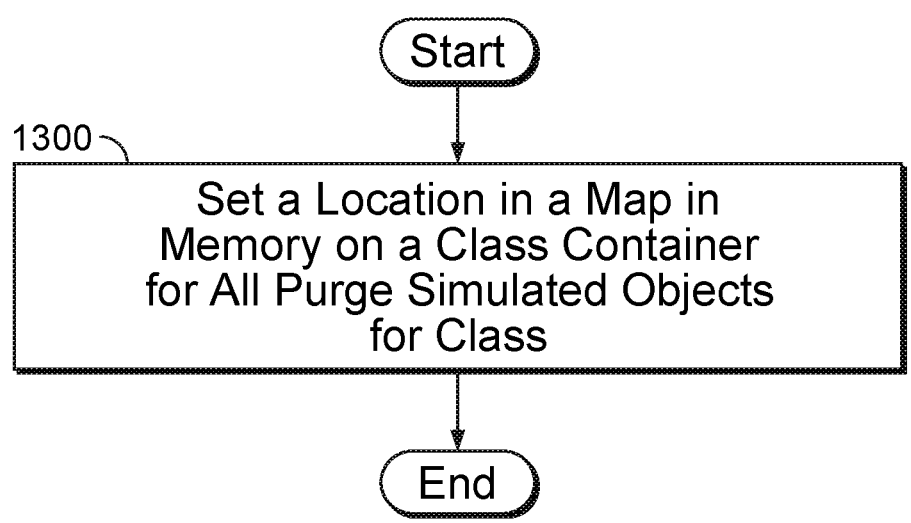
FIG. 13 is a flow diagram illustrating an embodiment of a process for marking data as purge simulated.

FIG. 13 is a flow diagram illustrating an embodiment of a process for marking data as purge simulated. In some embodiments, the process of FIG. 13 implements 1202 of FIG. 12. In the example shown, in 1300, a location is set in a map in memory on a class container for all purge simulated objects for the class. In various embodiments, preparing data to be purged comprises indicating the data is purge prepared in an attribute and/or in an object data table.

Figure 14:
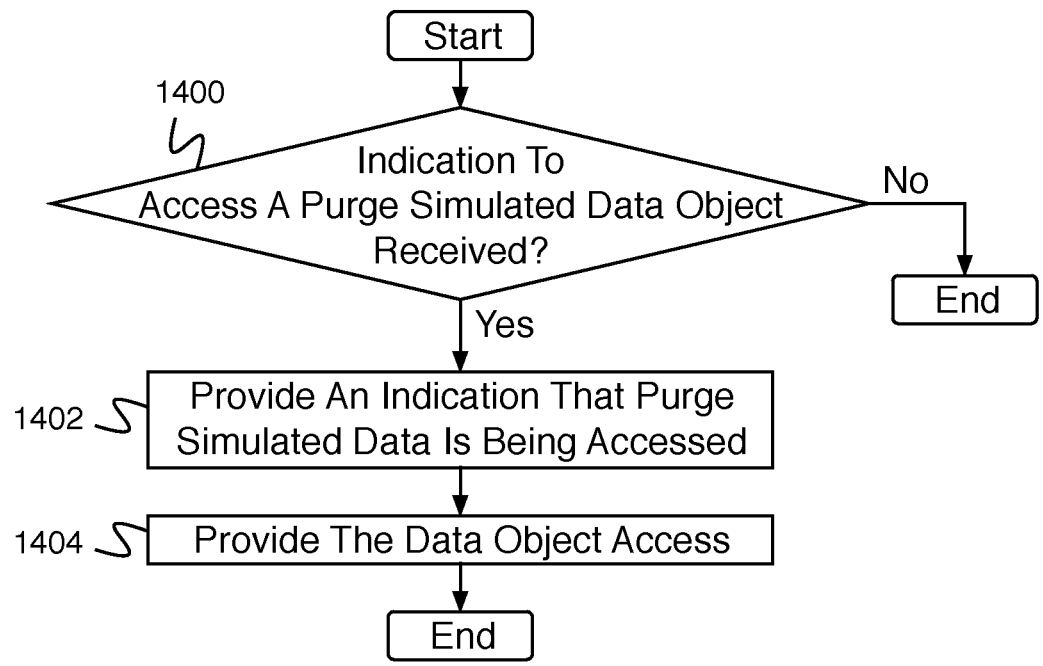
FIG. 14 is a flow diagram illustrating an embodiment of a process for monitoring data for access.

FIG. 14 is a flow diagram illustrating an embodiment of a process for monitoring data for access. In some embodiments, the process of FIG. 14 implements 1204 of FIG. 12. In the example shown, in 1400, it is determined whether an indication to access a purge simulated data object is received. In various embodiments, an indication to access a data object is received from a system user, from a system administrator, from a previously running process, from an automatically executed process, or from any other appropriate data accessor. In the event it is determined that no indication to access the data object is received, the process ends. In the event it is determined that a data access is received, control passes to 1402. In 1402, an indication that purge simulated data is being accessed and how it was accessed is provided. In some embodiments, an indication that purge simulated data is being accessed is provided to a system administrator. In some embodiments, an indication that purge simulated data is being accessed is provided to a purge simulated data object access counter. In 1404, access to the data object is provided.

Figure 15:
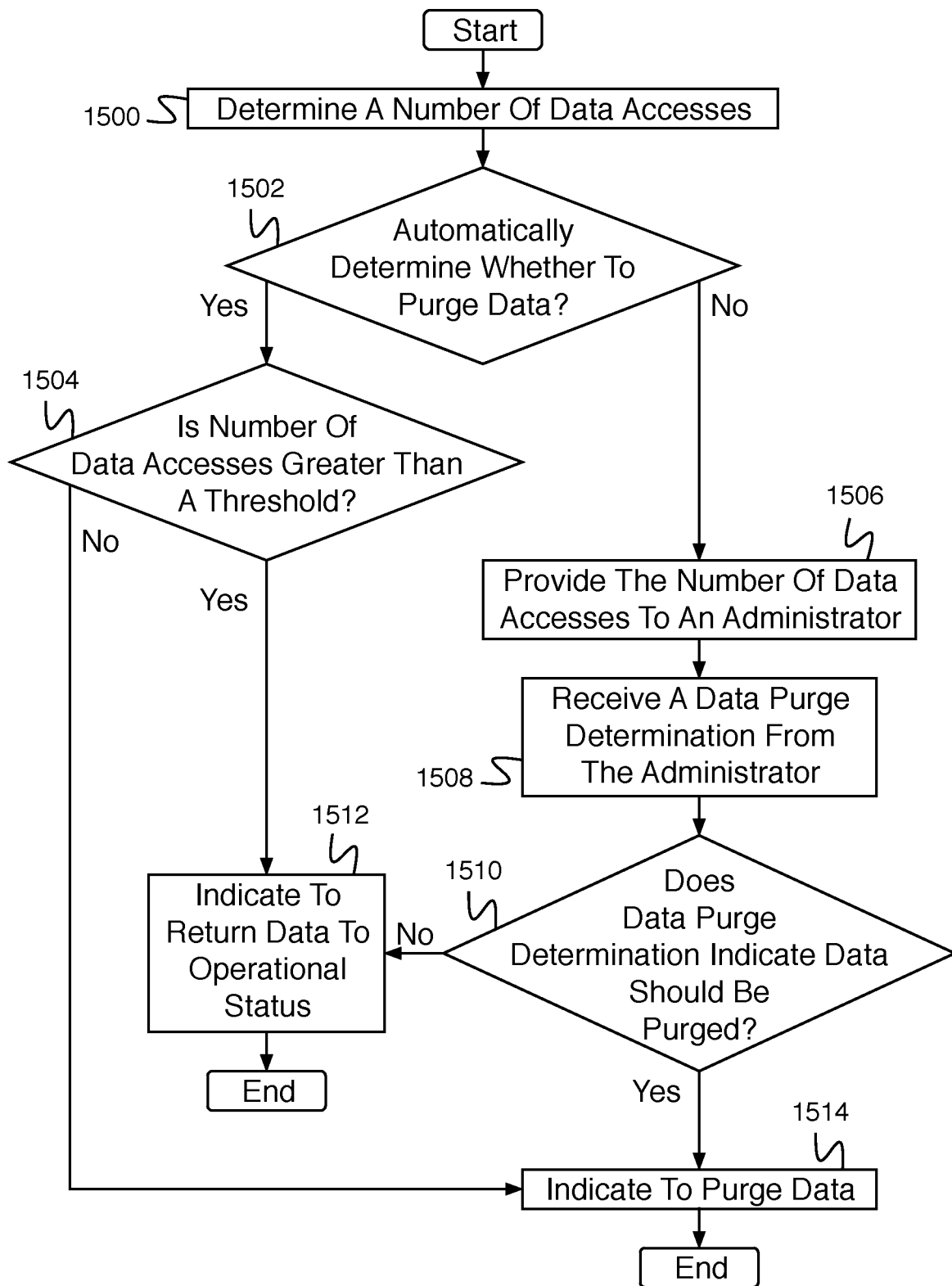
FIG. 15 is a flow diagram illustrating an embodiment of a process for determining whether to purge data.

FIG. 15 is a flow diagram illustrating an embodiment of a process for determining whether to purge data. In some embodiments, the process of FIG. 15 implements 1206 of FIG. 12. In some embodiments, the process of FIG. 15 comprises a process for determining whether purge simulated data should be purged. In the example shown, in 1500, a number of data accesses is determined. In some embodiments, a number of data accesses comprises a number of data accesses determined during a process for monitoring data for access (e.g., the process of FIG. 14). In some embodiments, how (e.g., which path, which task, which method, which process, etc.) the data was accessed is used to determine whether or not a data is to be purged. In 1502, it is determined whether to automatically determine whether to purge the data (e.g., whether the purge determination should be made automatically or manually). In various embodiments, the determination is based at least in part on the number of data accesses, on a system setting, on the data attributes, on the data age, on the data relations, or on any other appropriate information. In some embodiments, the number of accesses, the tasks and the particular stack trace (e.g., sequence of methods that lead to the access) are tracked, and also whether the access is through an expected relationship or not. In the event it is determined to manually determine whether to purge the data, control passes to 1506. In the event it is determined to automatically determine whether to purge the data, control passes to 1504. In 1504, it is determined whether the number of data accesses is greater than a threshold. In various embodiments, the data access threshold comprises 0 data accesses, 1 data access, 3 data accesses, 10 data accesses, or any other appropriate number of data accesses. In some embodiments, the data access threshold is a configurable number of accesses. In the event that the number of data accesses is not greater than the threshold, control passes to 1514. In the event that the number of data accesses is greater than the threshold, control passes to 1512.

In 1506, the number of data accesses is provided to an administrator (e.g., so that a manual data purge determination can be made). In 1508, a data purge determination is received from the administrator. In 1510, it is determined whether the data purge determination indicates the data should be purged. In the event it is determined that the data purge determination indicates the data should be purged, control passes to 1514. In the event it is determined that the data purge determination indicates the data should not be purged, control passes to 1512. In 1512, an indication is made to return the data to operational status (e.g., the purge simulate process has determined that the data should not be purged). In some embodiments, returning the data to operational status comprises removing one or more purge simulated indications (e.g., from the data, from an object data table, from a log file, etc.). In some embodiments, returning the data to operational status comprises stopping monitoring access to the data. In some embodiments, the data does not need to return to operational status from purge simulation as the data remains operational during the purge simulation. The process then ends. In 1514, an indication is made to purge the data (e.g., the purge simulate process has determined that the data should be purged). In some embodiments, purging the data comprises purge preparing the data and purging the data. In some embodiments, the data is purged using the process of FIG. 9.

Figure 16:
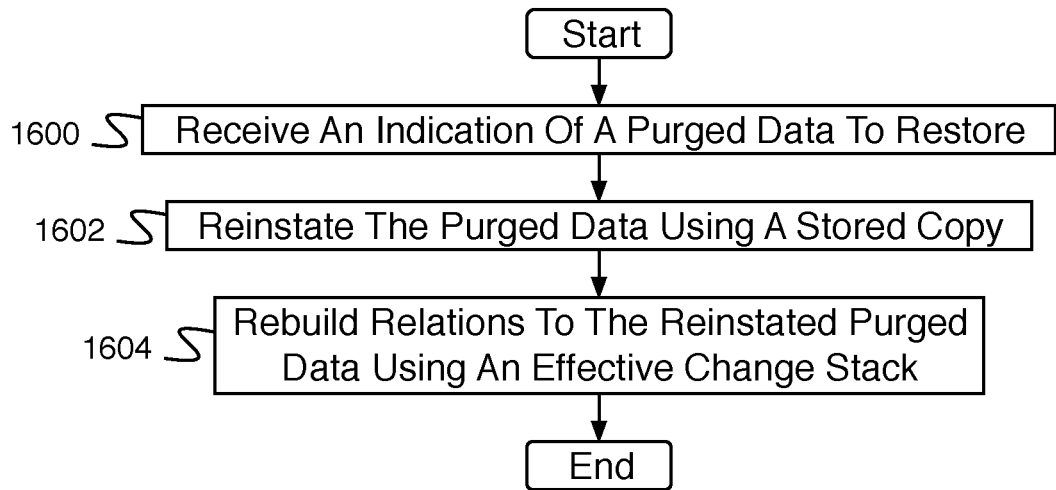
FIG. 16 is a flow diagram illustrating an embodiment of a process for restoring purged data.

FIG. 16 is a flow diagram illustrating an embodiment of a process for restoring purged data. In some embodiments, the process of FIG. 16 is performed by a data storage system (e.g., data storage system 200 of FIG. 2). In the example shown, in 1600, an indication of a purged data to restore is received. In various embodiments, the indication of a purged data to restore is received from a system administrator, from a system user, from an automated process for determining data to restore, or from any other appropriate indicator. In 1602, the purged data is restored using a stored copy. In some embodiments, the stored copy comprises a copy stored in a purge memory (e.g., purge object storage 204 of FIG. 2). In some embodiments, the stored copy comprises a copy stored as a data blob in an object data table (e.g., object data table 500 of FIG. 5). In some embodiments, reinstating the purged data comprises copying the purged data to working memory. In 1604 relations to the reinstated purged data are rebuilt using an effective change stack. In some embodiments, the effective change stack comprises a data blob stored in an object data table. In some embodiments, rebuilding relations using an effective change stack comprises stepping through a set of effective changes in an effective change stack and building relations (e.g., building each relation of a set of relations) corresponding to relations built in the effective change stack. In some embodiments, each instance keeps an AgingState attribute in the blob, this attribute is tracked in the effective change stack, and using this attribute, it can be determined whether a given instance has gone through one purge cycle or a plurality of purge cycles.

Figure 17:
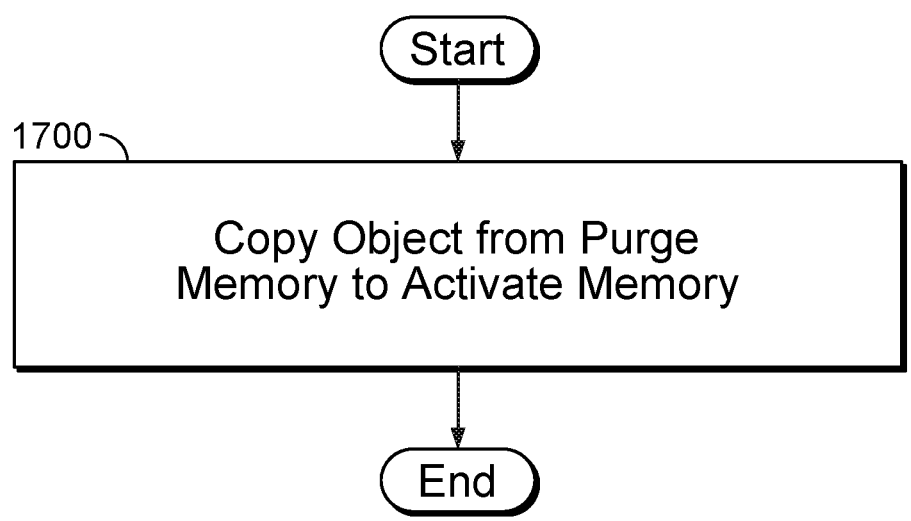
FIG. 17 is a flow diagram illustrating an embodiment of a process for restoring purged data using a stored copy.

FIG. 17 is a flow diagram illustrating an embodiment of a process for restoring purged data using a stored copy. In some embodiments, the process of FIG. 17 implements 1602 of FIG. 16. In the example shown, in 1700, object data is copied from purge memory to active memory. In some embodiments, purge memory comprises a purge object storage (e.g., purge object storage 204 of FIG. 2). In some embodiments, the object data is not deleted from purge memory, as purge memory is really a logical partition of the data in the database. In some embodiments, when an object is purged, a purge object attribute is changed, but the object is left in the same store (i.e., the database) and is removed from working or active or operational memory—the purge object attribute is enough for us to partition the database into operational and purged memory.

Figure 18:
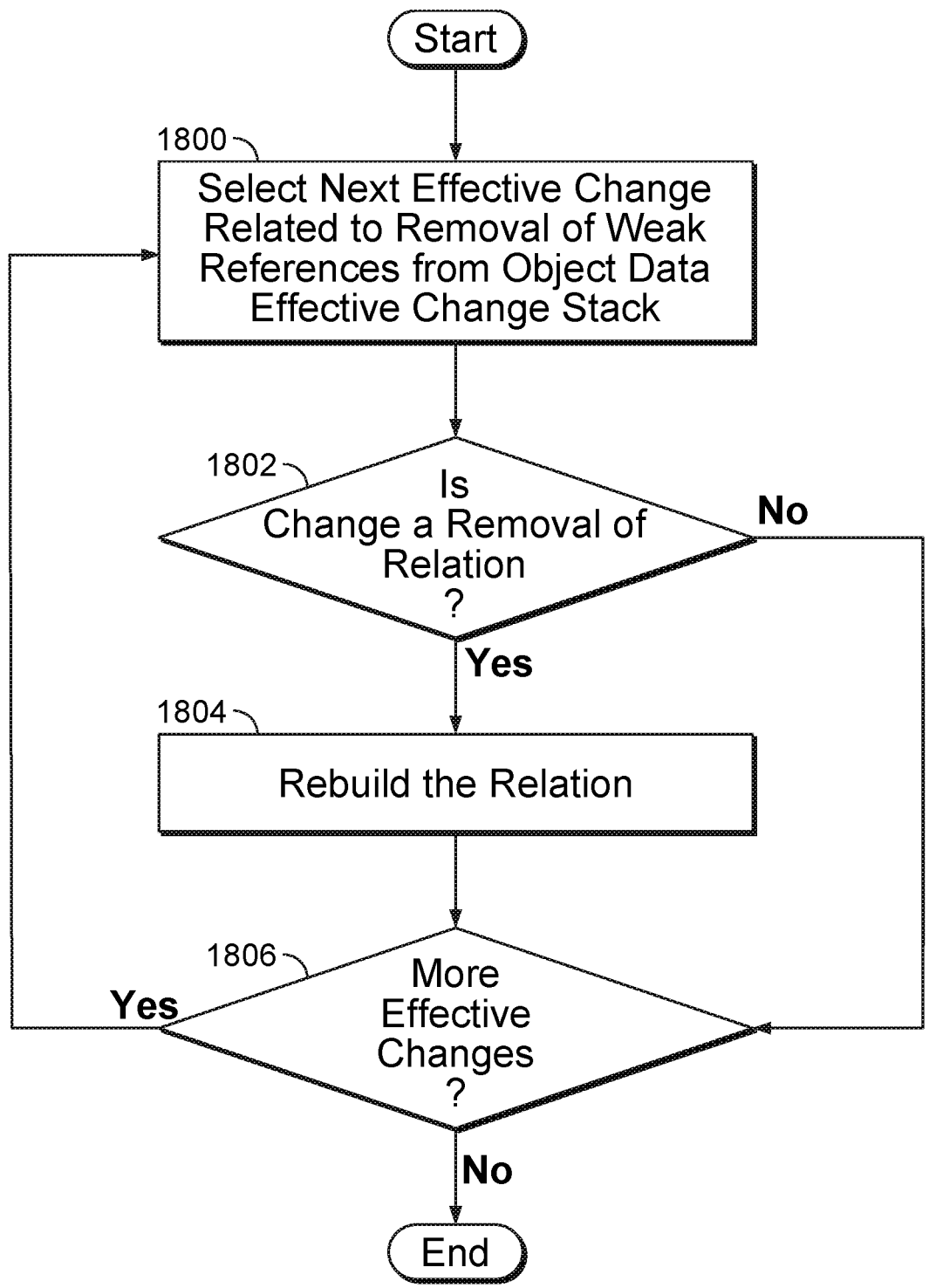
FIG. 18 is a flow diagram illustrating an embodiment of a process for rebuilding relations to reinstated purged data using an effective change stack.

FIG. 18 is a flow diagram illustrating an embodiment of a process for rebuilding relations to reinstated purged data using an effective change stack. In some embodiments, the process of FIG. 18 implements 1604 of FIG. 16. In the example shown, in 1800, the next effective change related to removal of weak references is selected from the object data effective change stack. In some embodiments, the next effective change comprises the first (e.g., the oldest) effective change. In some embodiments, the next effective change comprises the next most recent effective change. In 1802, it is determined whether the change comprises removal of a relation (e.g., a relation to or from the reinstate purged data object). In the event it is determined that the change does not comprise removal of a relation, control passes to 1806. In the event it is determined that the change describes removal of a relation, control passes to 1804. In 1804, the relation is rebuilt (e.g., a relation in the object data tree corresponding to the relation in the effective change is created). In 1806, it is determined whether there are more effective changes. In the event it is determined that there are more effective changes, control passes to 1800. In the event it is determined that there are not more effective changes, the process ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for simulating purging, comprising:
an input interface to receive an indication of a data to simulate purging, wherein the data comprises a purgeable metadata, and wherein the purgeable metadata comprises an object class inheritance from a purge root class or a purge member class;
a processor; and
a memory coupled with the processor, wherein the memory is configured to provide the processor with instructions which when executed cause the processor to:
mark the data as purge simulated;
monitor the data for access, comprising to:
determine that an indication to access a purge simulated data object has been received;
provide an indication that the purge simulated data is being accessed; and
provide access to the purge simulated data object; and
determine whether to purge the data, comprising to:
determine whether to automatically or manually determine whether to purge the data; and
in response to a determination that the data is to be purged automatically:
determine a number of data accesses; and
in response to a determination that the number of data accesses is equal to or greater than a threshold, indicate to return the data to an operational status, wherein the operational status relates to a non-purge status.

2. The system of claim 1, wherein the indication of the data to simulate purging is made based at least in part on a data age, a data relation, or a data attribute.

3. The system of claim 1, wherein the indication of the data to simulate purging comprises an indication in a map in memory on a class container for purge simulated objects for a class.

4. The system of claim 1, wherein the indication of the data to simulate purging comprises an attribute that is set associated with the data object.

5. The system of claim 1, wherein the data marked as purge simulated is purged.

6. The system of claim 5, wherein purging comprises purge preparing the data.

7. The system of claim 1, wherein the processor is further to determine whether to purge data marked as purge simulated based at least in part on a type of access.

8. The system of claim 1, wherein the threshold is one of the following: configurable, 0 data accesses, 1 data access, 3 data accesses, or 10 data accesses.

9. The system of claim 7, wherein a predetermined period of time is waited before determining whether to purge the data marked as purge simulated.

10. The system of claim 9, wherein the predetermined period of time comprises a configurable time, a configurable number of logins, or a configurable number of software updates.

11. A method for simulating purging, comprising:
receiving an indication of a data to simulate purging, wherein the data comprises a purgeable metadata, and wherein the purgeable metadata comprises an object class inheritance from a purge root class or a purge member class;
marking, using a processor, the data as purge simulated;
monitoring the data for access, comprising:
determining that an indication to access a purge simulated data object has been received;
providing an indication that the purge simulated data is being accessed; and
providing access to the purge simulated data object; and
determining whether to purge the data, comprising:
determining whether to automatically or manually determine whether to purge the data; and
in response to a determination that the data is to be purged automatically:
determining a number of data accesses; and
in response to a determination that the number of data accesses is equal to or greater than a threshold, indicating to return the data to an operational status, wherein the operational status relates to a non-purge status.

12. A computer program product for simulating purging, the computer program product being embodied in a non-transitory computer readable storage medium and comprising computer instructions for:
receiving an indication of a data to simulate purging, wherein the data comprises a purgeable metadata, and wherein the purgeable metadata comprises an object class inheritance from a purge root class or a purge member class;

marking the data as purge simulated;
monitoring the data for access, comprising:
> determining that an indication to access a purge simulated data object has been received;
> providing an indication that the purge simulated data is being accessed; and
> providing access to the purge simulated data object; and determining whether to purge the data, comprising:
> determining whether to automatically or manually determine whether to purge the data; and
> in response to a determination that the data is to be purged automatically:
>> determining a number of data accesses; and
>> in response to a determination that the number of data accesses is equal to or greater than a threshold, indicating to return the data to an operational status, wherein the operational status relates to a non-purge status.

* * * * *

UNITED STATES PATENT AND TRADEMARK OFFICE
CERTIFICATE OF CORRECTION

PATENT NO. : 10,552,387 B1
APPLICATION NO. : 14/970271
DATED : February 4, 2020
INVENTOR(S) : Seamus Donohue et al.

Page 1 of 1

It is certified that error appears in the above-identified patent and that said Letters Patent is hereby corrected as shown below:

In the Specification

In Column 6, Line(s) 35, delete "DASB" and insert --DA5B--, therefor.

Signed and Sealed this
Twenty-second Day of December, 2020

Andrei Iancu
*Director of the United States Patent and Trademark Office*